United States Patent [19]

Aizawa et al.

[11] 3,820,141
[45] June 25, 1974

[54] CAMERA DRIVING CONTROL DEVICE

[75] Inventors: Hiroshi Aizawa, Tokyo; Mitsutoshi Ogiso, Kawasaki, both of Japan

[73] Assignee: Canon Kabushiki Kaisha, Tokyo, Japan

[22] Filed: Dec. 26, 1972

[21] Appl. No.: 318,427

Related U.S. Application Data

[63] Continuation of Ser. No. 127,970, March 25, 1971, abandoned.

[30] Foreign Application Priority Data

Mar. 26, 1970 Japan.............................. 45-25738
Nov. 17, 1970 Japan............................ 45-101199

[52] U.S. Cl.............. 354/171, 95/31 AC, 95/31 EL
[51] Int. Cl.......................................... G03b 19/04
[58] Field of Search.......... 95/31 FL, 31 AC, 31 EL

[56] References Cited
UNITED STATES PATENTS

| | | | |
|---|---|---|---|
| 2,307,748 | 1/1943 | Philips | 95/31 AC |
| 2,522,214 | 9/1950 | Dreisbach | 95/31 AC |
| 3,009,406 | 11/1961 | Takahama | 95/31 AC |
| 2,227,964 | 1/1941 | Droting | 95/31 FL |

*Primary Examiner*—Monroe H. Hayes
*Attorney, Agent, or Firm*—Toren & McGeady

[57] ABSTRACT

When the film windup mechanism of a camera reaches a given point a control slider is engaged by a control lever to move a locking lever mounted on the control lever from its locking position for releasing a motor to rotate. The motor drives a release slider in a reciprocating motion such that the shutter is released by its forward motion and the locking lever is returned to its locking position by the return motion of the release slider.

21 Claims, 11 Drawing Figures

CAMERA DRIVING CONTROL DEVICE

This is a continuation of application Ser. No. 127,970 filed Mar. 25, 1971, now abandoned.

The present invention relates to a control device for a motor, and is especially intended to absorb within a short period of time the tendency of the motor to keep rotating because of the inertia of its load even after the motor's drive circuit is shut off.

According to another feature of the invention a control member is provided through a spring to axially and rotatably support a braking member which engages and disengages shutter release driving means of a camera driving control device for actuating it. At the same time said control member is axially and rotatably supported through a spring against a main body. The control member is held during the wind-up of film at the position at which it was set when film wind-up was started. At the same time said braking member is held at a braking position of a shutter release driving device.

The present invention is explained in detail with reference to the accompanying drawing wherein:

FIG. 6 A through FIG. 6 E are schematic drawings illustrating the action of parts of FIG. 5.

In FIGS. 1, 2, and 3 B is a power source battery, M is a motor, DC is a drive control device, BC is a brake control device, D is a differentiation circuit. When a input signal I is at the level of driving signal the output circuit of the control device DC turns "on" and electric current is supplied to the motor M from the power source B. Thus the motor keeps rotating. At this time the input signal I at a driving signal level, is applied either directly reversed if necessary, to the braking device DC through the differentiation circuit D. The output circuit of the above-mentioned braking device BC is turned "off". Next, as the input signal I reaches a braking signal level, the output circuits of the driving control device DC turns off. The supply of electricity from the power source B to the motor M is stopped. At the same time the input signal I of the above-mentioned driving signal is impressed on the brake control device BC directly or reversed as required through the differentiation circuit B. This places the output circuit of said braking control device BC in the on state. Thus the tendency to keep rotating by the load of motor can be absorbed within a short period of time determined by the above-mentioned differentiation circuit D.

Figure 1:
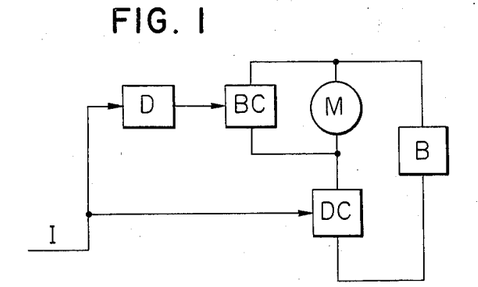
FIG. 1 is a block diagram showing an arrangement of embodying feature of the present invention.
Figure 2:
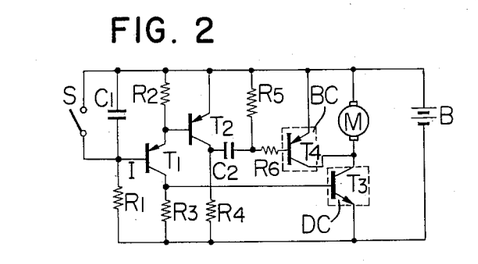
FIG. 2 and FIG. 3 are circuit diagrams showing apparatuses embodying features of the present invention.
Figure 3:
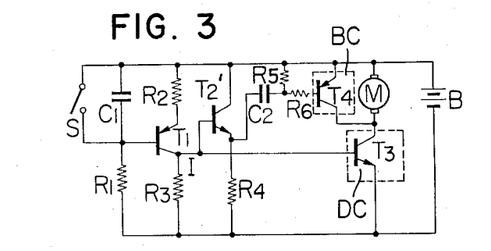

In the circuit of FIG. 2 and FIG. 3 the input circuit includes a time constant circuit and produces a voltage which is used as input signal I. In FIG. 2 and FIG. 3, a switch S shunts a capacitor $C_1$. The latter, with a resistance $R_1$ forming a time constant circuit. Capacitor $C_2$ forms part of a differentiation circuit. Transistors $T_3$ and $T_4$ form a braking control device BC and a driving control device DC, respectively.

In operation, when the switch S of FIG. 2 is off, the level of the input signal is low. Therefore the transistor $T_1$ is on. Thus the transistor $T_3$ which corresponds to the driving control device DC is on. Electric current is now supplied to the motor M from the battery B.

As shown, the motor M is driven while the switch S is off. At this time, while the transistor $T_2$ is on the input terminal of the capacitor $C_2$ has a high level, and its output terminal at a higher level. Therefore the transistor $T_4$ in the brake control device BC is off. Next, as the switch S is placed in an "on" position the electric charge which appeared at the capacitor $C_1$ beforehand is instantly discharged and the level of the input signal I becomes high. Transistor $T_1$ is now turned off, and the transistor $T_3$ for the drive control is turned off. This stops the supply of electricity from the battery B to the motor M. That is, the supply of electricity to the motor M is stopped as the switch S is turned on. As the transistor $T_2$ is in off the input terminal of the capacitor $C_2$ will have its level lowered, and as a result the level of the output terminal of the capacitor $C_2$ drops. Therefore, electric current suddenly flows to the capacitor $C_2$, and the transistor $T_4$ for braking control turns on. The flow of electricity which is generated between terminals of motor by the tendency of its rotor and its load to keep rotating is reversed to that during driving. The transistor $T_4$ which is short-circuited during a short period of time as determined by the differentiation circuit containing capacitor $C_2$, absorbs the tendency of the motor and its load to keep rotating.

In operation, the switch S of FIG. 3 is first in the off position. The level of the input signal to the transistor $T_1$ is low. The transistor $T_1$ is thus on. Therefore signal I becomes high and is applied directly to the transistor $T_3$. The transistor $T_3$ is then turned on so that electric current is supplied to the motor M from the battery B. That is to say, as the switch S is off, the motor M is driven. In this case while the transistor $T_2$ is on, the level of the input terminal of the capacitor $C_2$ is high, and the level of its output terminal is higher. Therefore the brake control transistor $T_4$ control is on. Next, as the switch S is placed in an on position in this state, the electric charge which has been charged to the capacitor $C_1$ beforehand is instantly discharged. As a result the transistor $T_1$ turns off. Thus the input signal I will have its level lowered and will be impressed directly to the transistor $T_3$. This turns off transistor $T_3$ and shuts off the supply of electricity from the battery B to the motor M. That is, to say as the switch S is on, the supply of electricity to the motor M is shut off. When the transistor $T_2$ is off, the level of the input terminal of the capacitor $C_2$ drops, and the level of the output terminal of the capacitor $C_2$ also drops, therefore electric current suddenly flows to the capacitor $C_2$. Then the transistor $T_4$ for braking control turns on. Electricity is generated between motor terminals by the tendency of the load to keep the motor rotating. The electrical output is reverse to that during driving at the output circuit of the transistor $T_4$ which is short-circuited for a period of time determined by the differential circuit containing the capacitor $C_2$. It thus becomes possible to absorb the tendency of the load to keep the motor rotating.

As has been explained above in the present invention the tendency of the load of motor to rotate can be absorbed in a short period of time even after a driving circuit is shut off. Therefore the present invention can have various applications and modifications as an electrically operated film wind-up device for a still camera, a film feeding device for a cine-camera, and a feeding device for a cine-projector and a tape recorder. At the same time this type of device can be provided in a relatively simple arrangement.

Figure 4:
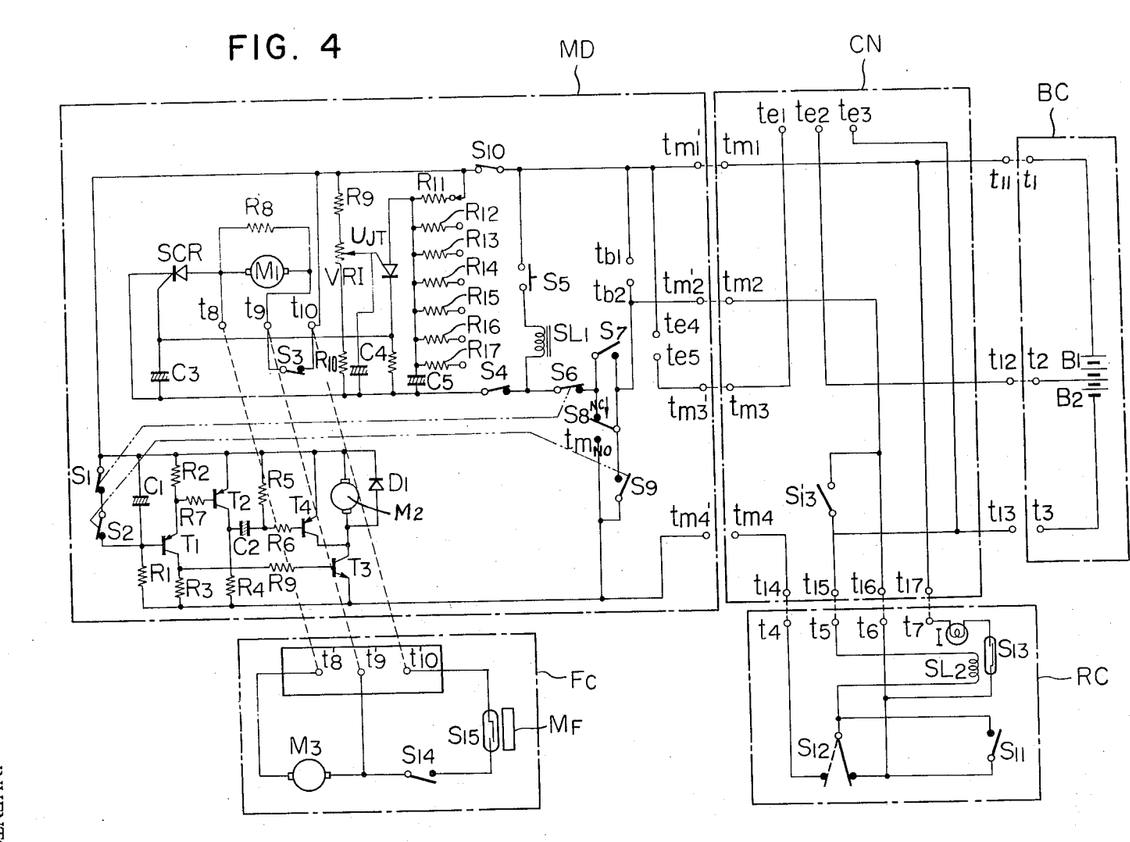
FIG. 4 is an electrical circuit diagram showing an example of a camera driving control device embodying features of the present invention and of a camera system equipped therewith.

In FIG. 4, BC is a battery case equipped with batteries $B_1$, $B_2$ and three terminals $t_1$, $t_2$, $t_3$. RC is a remote control unit, and $S_{11}$ is a change over switch between continuous photographing and a single frame photographing. $S_{12}$ is a switch to be changed over and connected to a terminal $T_4$ by remote release operation, and $S_{13}$ is a lead switch controlled by a relay $SL_2$, while I is an indication lamp.

The remote control unit RC has four terminals $t_4$, $t_5$, $t_6$, $t_7$.

ON is a battery connector, having a switch $S_{13}$, which turns off at the time of remote control within itself, also having terminals $t_{11}$, $t_{12}$, $t_{13}$ that correspond to the three terminals $t_1$, $t_2$, $t_3$ of the battery case BC. Terminals $t_{14}$, $t_{15}$, $t_{16}$, $t_{17}$ correspond to the four terminals $t_4$, $t_5$, $t_6$, $t_7$ of the above-mentioned remote control unit RC. In addition to above, said battery connector CN has three terminals $te_1$, $te_2$, $te_3$ provided for the purpose of connection with a servo-EE device or with a booster for long time exposure control. Four terminals $tm_1$, $tm_2$, $tm_3$, $tm_4$ are provided for the purpose of connection with a motor drive unit which has a motor for film wind-up and a motor for shutter release.

Next detailed explanation shall be made on a motor drive MD. Terminals $tm_1$, $tm_2$, $tm_3$, $tm_4$, correspond to terminals $tm_1$, $tm_2$, $tm_3$, $tm_4$. Terminals $tm_a$ is an extra terminal, $te_4$, $te_5$ are terminals for the above-mentioned servo-EE, and $tb_1$, $tb_2$ are terminals for direct coupling battery.

$S_{10}$ is a main switch, $S_0$ is such change over switch between continuous photographing and single frame photographing as in the change over switch $S_{11}$ and is in on state at the time of continuous photographing same as in $S_{11}$. $S_8$ is a switch which is switched over and connected to the terminal $tm$ by release operation. $S_9$ is a switch that prevents a release driving motor $M_2$ from being stopped in a middle, and is in a linked relationship with the switch $S_2$.

$S_6$ and $S_1$ are linked switches, which respectively stop the film wind-up motor $M_1$ and activate a release driving motor $M_2$ as they are placed in off state.

SCR is a silicon control rectifier, UJT is a double base diode, $R_8$, $R_9$, $R_{10}$, $R_{11}$ through $R_{17}$ are resistors, $C_3$ and $C_4$ are capacitors for preventing noise, $C_5$ is a capacitor which is connected to either one of the resistors $R_{11}$ through $R_{17}$ to form a time constant circuit, and VRI is a potentiometer to vary the activating point of the time constant circuit.

$S_5$ is an elastic coupling switch to detect completion of film wind-up, wherein an adoption of a pressure-sensitive switch is advisable. SLI is an electro-magnet which is actuated at the time of completion of wind-up. $S_4$ is a switch which is placed in off state when there is no remainder in film to be wound. $S_3$ is a switch which is placed in off state when a film chamber for long length film is attached. $t_8$, $t_9$, $t_{10}$ are terminals which correspond to the three terminals $t_8'$, $t_9'$, $t_{10}'$ of a film chamber unit FC.

In a control circuit for the release driving motor $M_2$, $C_1$ is a delay capacitor. $R_1$ is a resistor which composes a time constant circuit of a delay timer together with $C_1$. $Tr_1$ is an input stepped transistor. $R_4$ is a collector load for the transistor $tr_1$. $R_9$ is a base resistance for the transistor $Tr_4$ for motor driving control. $R_2$ is an emitter load for the transistor $Tr_1$. $R_3$ is a base resistance for the transistor $Tr_2$. $R_5$ is a collector load of the transistor $Tr_2$. $C_2$ is a capacitor composing the differentiation circuit. $R_6$, $R_7$ are resistances. $Tr_3$ is a transistor for braking motor. $D_1$ is a diode to eliminate noise generated from the motor $M_2$.

The film chamber unit has within itself a motor $M_3$ for winding up long lengths film, and has terminals $t_8'$, $t_9'$, $t_{10}'$ which correspond to the abovementioned three terminals $t_8$, $t_9$, $t_{10}$. $S_{14}$ is a switch which becomes on-off by the loading of a long length film to automatically stop the motors $M_1$, $M_3$. $S_{15}$ is a lead switch which becomes on only when a film gate for a long length film magazine is opened. MF is a ferite magnet which is held against the lead switch $S_{15}$ at such position as magnetizing the lead switch only when the film gate of magazine is opened. In the motor drive unit of FIG. 7, $M_1$ is a motor for wind-up, and a gear $a_3$ is friction coupled to a rotating axle $a_1$ of said motor through a compression spring $a_2$, so that a rotation is transmitted to a coupling joint $a_{12}$ for a camera through reduction gears $a_4$ through $a_{10}$ and a one way clutch $a_{11}$.

Figure 7:
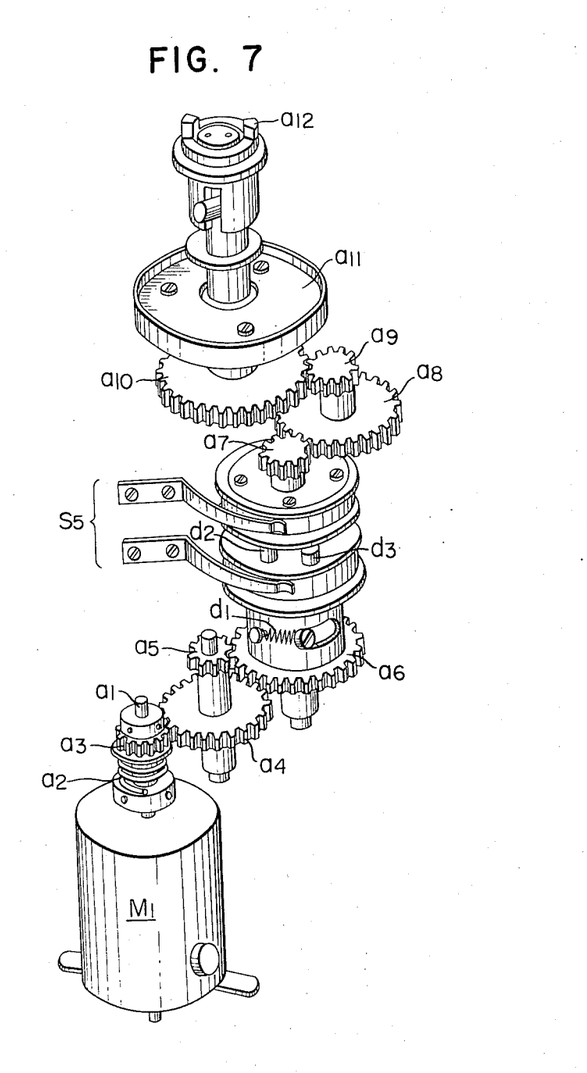
FIG. 7 is an oblique view showing an example of a film windup mechanism.

Gears $a_6$ and $a_7$ are elastically coupled by a spring $d_1$ and contacts $d_2$, $d_3$ provided on both gears rotate together maintaining a constant distance therebetween in the course of wind up. As the wind up mechanism of a camera stops the gear $a_7$ stops. Then the torque of the motor $M_1$ overcomes the spring $d_1$ and the gear $a_6$ rotates as it expands the spring $d_1$. As the contact $d_2$ comes in contact with the contact $d_3$, the switch $S_5$ of the above-mentioned circuit becomes on and such torque sensor as exciting the electro-magnet $SL_1$ is composed.

Figure 5:
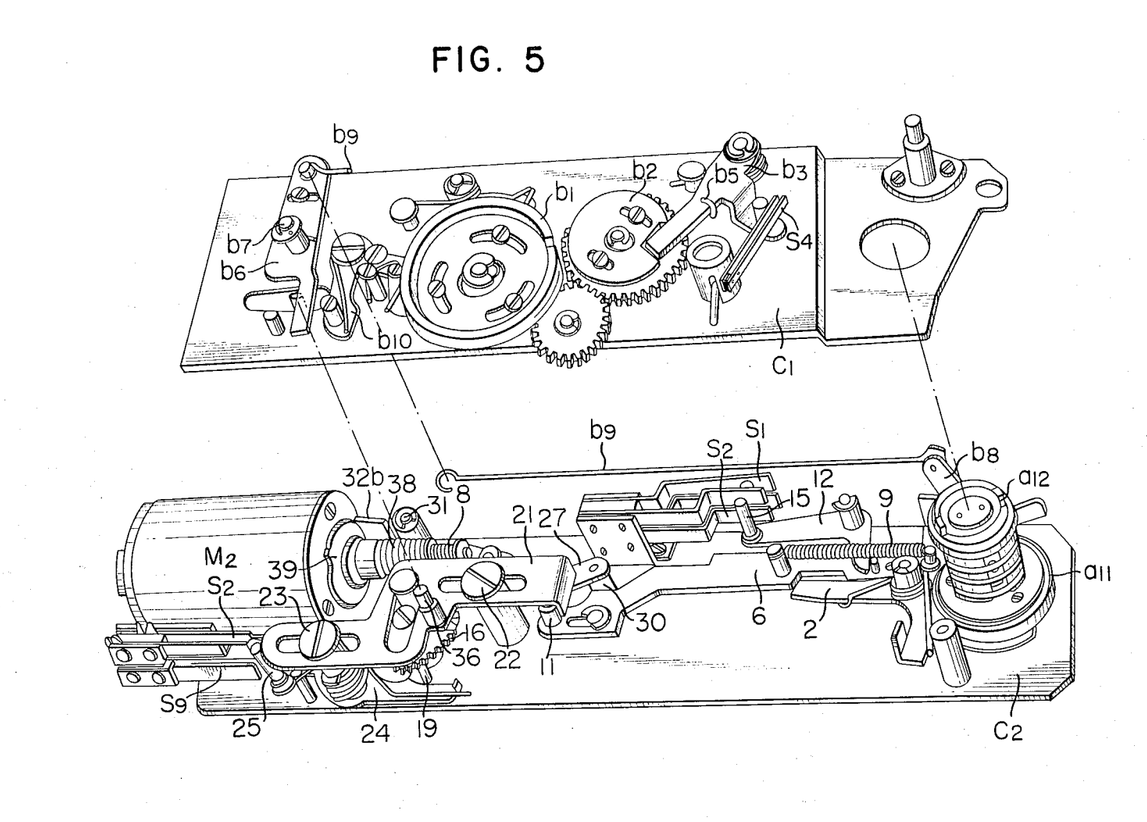
FIG. 5 is a perspective view showing the mechanical make-up of a control device having a braking system embodying features of the present invention.

In FIG. 5 a film counter $b$ is axially supported on a shelf plate $C_1$. A cam plate $b_2$ is linked by gear with the counter $b_1$. A lever $b$ is always pressure contacted by the spring $b_5$ to external circumference of the cam $b_2$, and drops in a low part of the cam $b_2$ when the number of remaining film reaches zero to place the switch $S_4$ of the above-mentioned circuit in off state to stop the action of motor.

A release lever $b_6$ rotates around an axle $b_7$. A lever $b_8$ is linked with a release button of a camera. A rod $b_9$ connects the lever $b_6$ and $b_8$. A lever $b_{10}$ drives a film counter in a linked movement with the lever $b_6$.

Figures 6A, 6B, 6C:
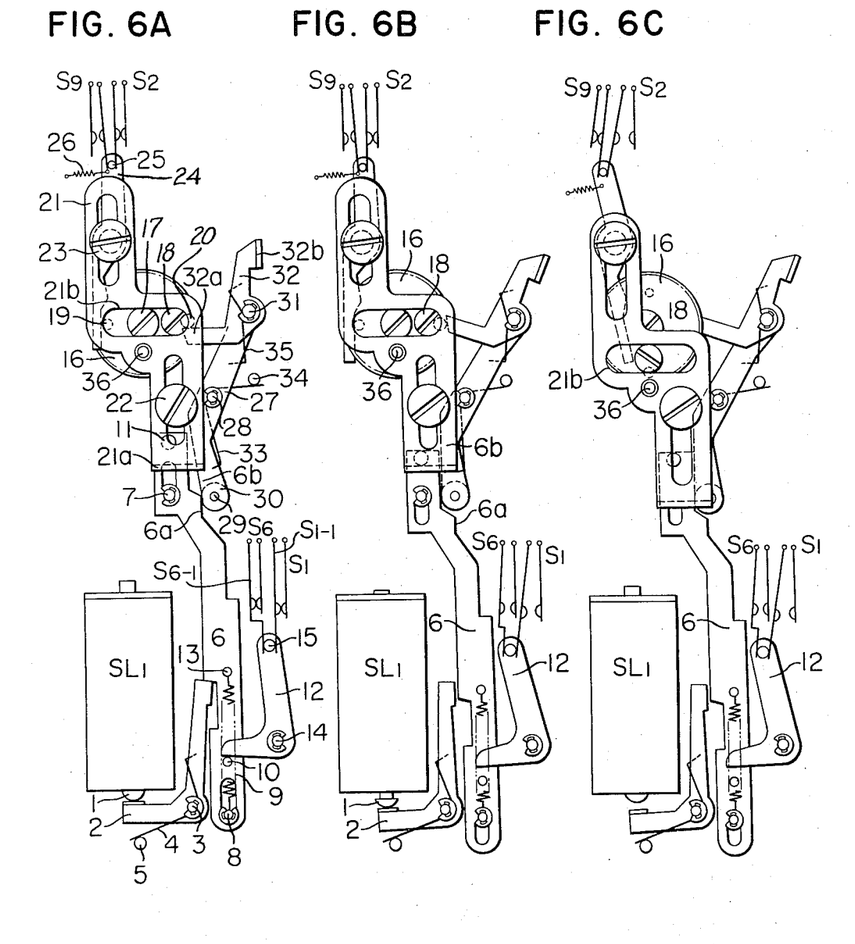
Figure 6D:
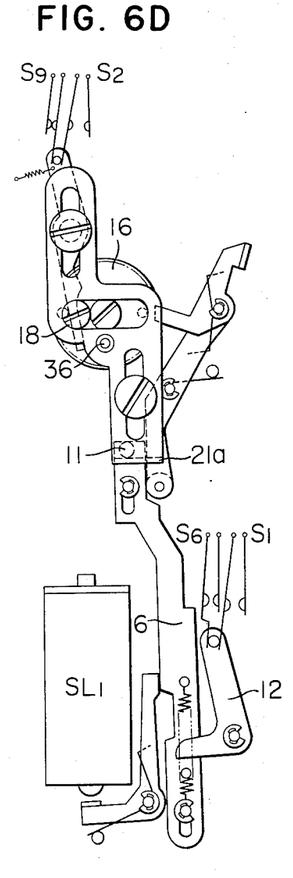
Figure 6E:
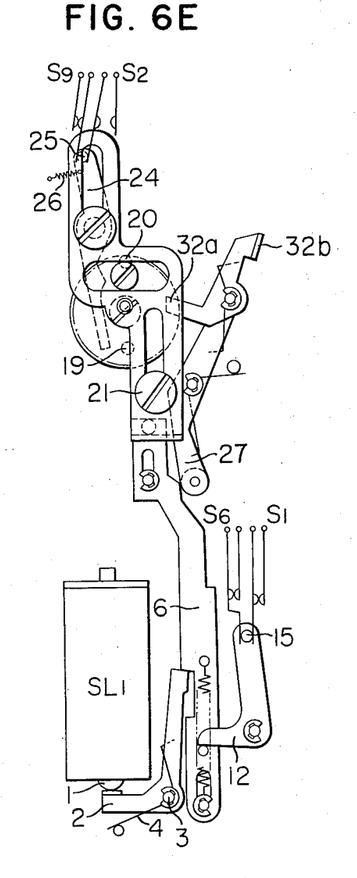

In FIG. 6, an electro-magnet $SL_1$ is fixed to a body $C_2$. A plunger 1 is shifted to lower part of the drawing when current is impressed. A locking lever 2 is rotated by the plunger 1 and can be rotated around an axle 3 which is fixedly provided at the body $C_2$, at the same time is given a tendency to rotate to a clockwise direction by a return spring 4. A pin 5 supports a spring.

A control slider 6 is guided by pins 7, 8 being fixed to the body $C_2$, and is biased to lower direction in the drawing by a spring 9. 13 is a pin to which said spring 9 is hung. 10 and 11 are pins fixed on the slider 6.

A switch operating lever 12 which is driven by the pin 10 and is rotatably provided on the body $C_2$ by an axle 14, also has a switch operating pin 15 fixed on the same. A worm wheel 16 is driven by the motor $M_2$ for releasing through a worm 38, and is rotatably supported by an axle 17 fixed on the body. The wheel 16 has a pin 18 on the front side in the drawing and pins 19, 20 on the other side. The pins 18, 19, 20 are fixedly provided at the worm wheel 16. 21 is a release slider to which a reciprocating movement is given by said pin 18, and is guided by guide members 22, 23 fixedly provided on the body. A bent part 21a at an end of said slider is so composed as can be coupled to the pin 11. A lever 24 opens and closes the switches $S_2$, $S_9$, and is rotatable around the member 23 which serves as an axle, and has a switch drive pin 25 being fixedly provided thereon, at the same time is given a tendency to rotate to a counter-clockwise direction on the drawing. A control lever 27 is axially supported in a rotatable manner by an axle 28 which is fixedly provided on the case body, and a roller 30 is provided to one end of said lever by a fixed axle 29, while a locking lever 32 is rotatably provided to the other end by a fixed axle 31. The roller 30 is located to enable the same to engage with the slider 6, while the end 32a is placed to enable itself to engage with the pin 19 on the reverse side of the worm wheel, and the end 32b of the lever 32 is provided at such position as enabling itself to engage with a locking claw 39 provided at an axle of the motor $M_2$ for releasing when required.

A spring 33 gives the lever 27 the tendency to rotate to clockwise direction in the drawing. 34 is a pin to hook spring. 35 is a spring to give the lever 32 the tendency to rotate to clockwise direction in the drawing. 36 is a pin for releasing fixedly provided on the slider 21.

Next, the function of the present invention shall be described.

FIG. 6-A shows the situation when the wind-up is completed, wherein as $S_1$, $S_6$, $S_2$ are in on state. The electricity supply circuit for the wind-up drive motor $M_1$ is on. while the electricity supply circuit for the release driving motor $M_2$ turns off, a torque sensor is activated to place the switch $S_5$ in on. Therefore the electro-magnet $SL_1$ is excited and the plunger 1 pushes out the lever 2, which releases the engagement of the lever 2 and the slider 6, then the slider 6 is shifted downward in the drawing by the tension of the biasing spring 9. Thereby the lever 12 which has been restricted by the pin 10 is rotated by a stability of a contact arm $S_{1-1}$ of $S_1$ to a counter-clockwise direction (the spring stability of $S_4$ is greater than that of $S_{6-1}$). Then both of the switches $S_1$, $S_6$ are switched over to off by the pin 15 as shown in FIG. 6-B. As the $S_1$ becomes off the power supply circuit for the motor $M_1$ becomes off and the wind-up driving system is stopped. And as the $S_6$ becomes off, the preparation for charging of the capacitor $C_1$ of the control circuit for the motor $M_2$ is completed. At the same time by shifting of the slider 6 the roller 30 which has been riding on the stepped part 6a of the slider is shifted to a lower stepped part 6b by the power of the spring 33, thereby the control lever 27 is rotated to a clockwise direction. Therefore the lever 32 which is provided at the other end of the lever 27 is shifted upward in the drawing, then the end part 32a of the lever 32 evacuates itself from a rotating zone of the pin 20, and at the same time the other end 32b of the lever 32 evacuates itself from the rotating zone of the locking claw 39 provided on the axle of the motor. Thus the motor $M_2$ for driving the release has its both locks, i.e., mechanical locks and electrical lock released and is placed in a state ready for activation. Next, as a user operates a push button (not shown in the drawing) to place the NO side of the switch $S_8$ in on state, a voltage is impressed on the power supply circuit for the motor $M_2$, and after an elapse of a predetermined time which has been set by a delay circuit, $M_2$ is activated. The rotation of the $M_2$ is transmitted to the worm wheel 16 through the warm 28. The wheel 16 is rotated to the clockwise direction in the drawing and shifts the slider 21 to right hand side by the engagement of the long hole part 21b and the pin 18 on the wheel 16. And by this movement the pin 36 on the slider 21 activates a shutter of camera through the levers $b_6$, $b_8$. By the rotation of the wheel 16 the pin 19 on the wheel 16 is rotated releasing the restriction of the lever 24, therefore the lever 24 is rotated to the counter-clockwise direction in the drawing by the tension of the biasing spring 26, then the pin 25 on the lever 24 changes over the switches $S_2$, $S_9$ from the state of FIG. 6-B to the state shown in FIG. 6C.

As the $S_9$ is on, even if a user releases the NO side of $S_8$ by carelessly releasing his hand off the release button, the impressing of voltage is retained by $S_9$.

The position of the wheel 16 as it rotates 90° is what is shown in FIG. 6C, and in this phase the transposition of the slider 21 becomes maximum, thus the release action is completed. The wheel 16 further continues its rotation and proceeds to the phase of 180° rotation as shown in FIG. 6D, and during said process the action of shutter is completed.

In the phase of FIG. 6D the end part 21a of the release slider 21 and the pin 11 on the slider 6 are placed in an engaged state. As the rotation of the wheel 16 further proceeds the slider 21 is shifted to left hand side, and by the engagement of the end 21a and the pin 11, the slider 6 is shifted upward in the drawing against the spring 9. And as it reaches the phase shown in FIG. 3E the lever 2 and the slider 6 engage to each other again, and the slider 6 is restricted by the lever 2 in a biased state by the spring 9. At the same time the pin 10 on the slider 6 rotates the lever 12 to a clockwise direction, thereby the switches $S_1$, $S_6$ are changed over to on again. As S is placed in on state the power supply circuit for the motor $M_1$ has its power supply preparation completed. And while the $S_1$ turns on, since the switch $S_2$ which is in series with $S_1$ has already turned off in the phase shown in FIG. 6C, the power supply circuit for motor $M_2$ is still retained in a state wherein voltage is impressed. At the same time as the slider 6 resumes its original position the lever 27 is also returned to its original position. Therefore the end 32a of the locking lever 32 on the lever 27 comes to such position as facing the rotating zone of the pin 20 on the wheel 16. While the wheel 16 further continues its rotation and resumes the original phase shown in FIG. 6A, the pin 19 on the wheel 16 rotates the lever 24 in a clockwise direction against the spring 26 just before the wheel 16 resumes its original phase, and the pin 25 on the lever 24 is changed over from the state shown in FIG. 6E to the state shown in FIG. 6A.

Then and there the power supply circuit for motor $M_2$ turns off for the first tine. At the same time electrical braking is effected by the driving control transistor $Tr_2$, the braking transistor $Tr_3$, then the pin 20 on the wheel 16 pushes the end part 32a of the locking lever 32 rotating the lever 32, and having the other end 32b face the rotating zone of the locking claw 39 of the axle of the motor $M_2$. Thereby the locking claw 39 and the end part 32a engages with each other, and the motor $M_2$ is placed in a completely stopped state, thus completing one cycle of the release driving system. Then as the user releases his hand off the release button (not shown in the drawing), the $S_8$ is changed over from on of the NO side to on of the NO side, thus a voltage is impressed on the power supply circuit for the motor $M_1$. Then after a pause of a predetermined length of time determined by a time circuit the wind up action is started, returning to the state wherein this explanation was started.

While what has been explained above pertains to one frame photography, in continuous photographing since the switch $S_7$ is retained in on state. The power supply circuits for the motors $M_2$, $M_1$ have voltage impressed thereon alternately as long as the user keeps pushing the operating button, and as the wind-up and release are repeated and the botton is released, at the time when it is shifted from the state of completion of wind-up to starting of the motor $M_2$, the device is placed in a stopped state by placing the NO side of switch $S_8$ in off state, that is the device is stopped in a wind-up completion state.

Since in the above-mentioned structure of the present invention the motor for releasing is surely stopped and the stopping position of the release mechanism can be precisely determined, there will be no obstruction for next wind-up action, thus a motor driving device which makes sure action can be obtained.

What is claimed is:

1. A motor drive control apparatus for a camera, comprising a first motor for wind-up and a second motor for releasing; a control slider for making a forward movement when a wind-up mechanism of said camera reaches a limit point; a release slider driven to make reciprocating movements by said second motor; a control lever engaging with said control slider; a locking lever supported on said control lever, said locking lever being moved from its locking position by the forward movement of said control slider for releasing said second motor to rotate; a worm wheel for transmitting rotation of said second motor to said release slider for giving a forward movement to said slider to effect shutter release and a return movement for giving said control slider a return movement thereby returning said control lever to its original position and at the same time shifting said locking lever to a locking position for stopping the rotation of said second motor.

2. For a camera having a wind-up mechanism and a shutter release, a motor drive control apparatus, comprising: first motor means for winding up the wind-up mechanism, a control slider responsive to the wind-up mechanism and executing a forward movement when a wind-up mechanism reaches a limit point, a control lever engaging said control slider and movable thereby, second motor means for operating said shutter release, a locking lever supported on said control lever and movable by said control lever from a position in which it locks said second motor means in position to a second position in which it releases said second motor means, a reciprocable release slider engageable with said control slider and capable of actuating the shutter release, worm wheel means coupled to said second motor means for imparting a forward motion to said release slider so that said release slider actuates the shutter release and executes a return movement for imparting a return movement to said release slider so that said release slider returns said control lever to its original position and at the same time shifts said locking lever to its locking position so as to stop rotation of said second motor means.

3. An apparatus as in claim 2, wherein motor driving means responsive to the position of said control slider drives said second motor means, said driving means including a power source and absorption means for absorbing the inertial movement of said second motor means when current supply from the power source to said second motor means is cut off, said driving means including a differentiating circuit for enabling said absorption means.

4. An apparatus as in claim 3, wherein said driving means includes a drive control circuit, said absorption means including a braking control circuit, said driving control circuit being responsive to said motor driving means reaching a predetermined signal lever so as to connect said power source to said motor means, said braking control circuit receiving an input signal through said differentiating circuit when the input signal to said driving circuit reaches a control signal level, said braking control circuit bypassing current generated across said second motor means by the inertial rotation of said second motor means and the countercurrent produced thereby.

5. For a camera having a wind-up mechanism and a shutter release, a motor drive control apparatus, comprising:
first motor means for operating said wind-up mechanism,
second motor means for operating the release mechanism,
a power source,
first driving control means coupling said power source to said first motor means,
second driving control means coupling said power source to said second motor means,
follower means responsive to said second motor means,
shutter release means responsive to said follower means for actuating said shutter release,
detector means for detecting a predetermined rotational position of said follower means,
said second driving control means being responsive to the first motor means reaching a predetermined position, and
stopping means for stopping said follower means at the predetermined rotational position in response to the detection by said detecting means.

6. An apparatus as in claim 5, wherein said shutter releasing means includes means for converting the rotation of said follower means into an action for actuating the shutter release.

7. An apparatus as in claim 5, wherein said shutter releasing means includes a film counter responsive to each operation of the shutter release.

8. An apparatus as in claim 7, wherein said film counter includes disabling means for rendering said first motor means inoperative with respect to said wind-up mechanism in response to said film counter determining that the remaining number of films is zero.

9. An apparatus as in claim 5, wherein said first driving control means includes coupling means for detecting the completion of film wind-up by the wind-up mechanism and transmitting the detected signal to said second driving control means.

10. An apparatus as in claim 9, wherein said coupling means includes a torque sensor for detecting the torque of said first motor means.

11. An apparatus as in claim 9, wherein said coupling means includes electromagnetic means responsive to completion of film wind-up by the wind-up apparatus.

12. An apparatus as in claim 5, wherein said second driving control means includes circuit means for controlling the current supply to said second motor means.

13. An apparatus as in claim 12, wherein said circuit means includes a differentiating circuit having absorption means for absorbing countercurrent produced by inertial rotation of said second motor means after the current supply to said second motor means from the power source is stopped.

14. An apparatus as in claim 13, wherein said circuit means further includes a driving control circuit, a braking control circuit, said driving control circuit being responsive to an input signal to said circuit means reaching a driving signal level for connecting the power source to said second motor means, said braking control circuit being a portion of said absorption means and responsive to the differentiation of said differentiation circuit for carrying the countercurrent when the input signal to said circuit means reaches a control signal level.

15. An apparatus as in claim 5, wherein said second driving control means includes mechanical braking means for stopping the follower means rotationally driven by said motor means at a predetermined position.

16. An apparatus as in claim 14, wherein said second motor means includes a rotating shaft, said mechanical braking means further including an engaging member coupled to said rotating shaft, a stopping member engageable with said engaging member, engagement means for engaging both of said stopping member and said engaging member and actuated in response to said detecting means.

17. A motor driving control device for a camera comprising:
motor means,
shutter releasing means for releasing the shutter of the camera,
driving control means having a power supply coupled to said motor means for controlling the operation of said motor means,
follower means rotationally driven by said motor means
said follower means being operatively connected to said shutter releasing means to actuate the operation thereof,
detecting means for detecting a predetermined rotational position of said follower means and for generating a signal corresponding to the predetermined rotational position of said follower means to said driving control means, and
stopping means for mechanically braking said follower means and for stopping said follower means at the predetermined rotational position in response to the signal of said detecting means.

18. An apparatus as in claim 17, wherein said stopping means further includes mechanical braking means movable between a position for stopping the motor rotation and a position for permitting the motor rotation, and means for enabling said braking means.

19. An apparatus as in claim 18, wherein said enabling means includes a sliding member, a stopping member for said sliding member and a regulating member which is moved by said sliding member and operates the mechanical braking means.

20. An apparatus as in claim 18, wherein said driving control means further includes an electric circuit for controlling the current supply to said motor means.

21. An apparatus as in claim 20, wherein said electric circuit further includes a differentiating circuit, a driving control circuit, and a braking control circuit; said driving control circuit being responsive to an input signal to said electric circuit reaching a driving signal level and permitting flow of current to said second motor means, said braking circuit being responsive to said differentiating circuit when the input signal to said electric circuit reaches a control signal level different from said driving signal level.

* * * * *